(12) United States Patent
Todori et al.

(10) Patent No.: US 7,081,328 B2
(45) Date of Patent: Jul. 25, 2006

(54) OPTICAL DISK HAVING SUPER-RESOLUTION FILM

(75) Inventors: Kenji Todori, Yokohama (JP);
Toshihiko Nagase, Kawasaki (JP);
Katsutaro Ichihara, Yokohama (JP);
Naoko Kihara, Matsudo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 189 days.

(21) Appl. No.: 09/819,621

(22) Filed: Mar. 29, 2001

(65) Prior Publication Data

US 2001/0038900 A1 Nov. 8, 2001

(30) Foreign Application Priority Data

Mar. 29, 2000 (JP) .............................. 2000-092160

(51) Int. Cl.
*G11B 7/24* (2006.01)
(52) U.S. Cl. .......................... 430/270.11; 430/270.13; 430/945; 430/269; 428/64.8; 369/283
(58) Field of Classification Search .......... 430/270.13, 430/321, 320, 945, 270.11, 269; 428/64.8; 369/283
See application file for complete search history.

(56) References Cited

U.S. PATENT DOCUMENTS 4,670,345 A * 6/1987 Morimoto et al. .......... 430/945
4,969,141 A * 11/1990 Takaoka et al. ............. 430/945
5,168,031 A * 12/1992 Buckingham et al. ....... 430/945
5,456,961 A 10/1995 Iida et al.
5,470,910 A * 11/1995 Spanhel et al. ............. 324/785
5,474,874 A 12/1995 Asai et al.
5,824,240 A 10/1998 Sato et al. ................... 252/582

FOREIGN PATENT DOCUMENTS

EP 0 316 909 5/1989

(Continued)

OTHER PUBLICATIONS

Gindele, F, et al., "Optical gain and high quantum dot efficiency of matrix free, closely packed CdSe quantum dots", Appl. Phys. Lett., vol. 71(15) pp. 2181-2183 (Oct. 1997).*

(Continued)

*Primary Examiner*—Martin Angebranndt
(74) *Attorney, Agent, or Firm*—Pillsbury Winthrop Shaw Pittman, LLP

(57) ABSTRACT

An optical disk from which recorded data are read out by means of light irradiation has a substrate having recording pits as data on a surface thereof, and stacked films formed on the substrate. The stacked films contain a super-resolution film of a polymer matrix and semiconductor particles having an organic group covalently bonded thereto, and a reflective film reflecting light. The super-resolution film and the reflective film are provided in this order from a light incident side.

14 Claims, 4 Drawing Sheets

FOREIGN PATENT DOCUMENTS

| | | | |
|---|---|---|---|
| EP | 0 431 973 | | 6/1991 |
| EP | 0 580 346 | | 1/1994 |
| JP | 03-199137 | * | 8/1991 |
| JP | 05-28535 | | 2/1993 |
| JP | 05-24254 | | 9/1993 |
| JP | 6-28713 | | 2/1994 |
| JP | 06044609 | | 2/1994 |
| JP | 07-296419 | | 11/1995 |
| JP | 2001-35011 | | 2/2001 |
| WO | 99/21934 | * | 5/1999 |

OTHER PUBLICATIONS

Synthesis and Characterization of Nearly Monodisperse CdE (E=S, Se, Te) Semiconductor Nanocrystallites, J. Am. Chem. Soc. 1993, vol. 115, pp. 8706-8715.

Journal of Applied Polymer Science, "Laser-Irradiation Effect on Poly(vinyl alcohol) Films Doped with Nanometer-Sized CdS Particles: Ablation and Third-Harmonic Generation", Y. Nosaka, K. Tanaka and N. Fujii, Mar. 10, 1993, No. 10, pp. 1773-1779.

* cited by examiner

OPTICAL DISK HAVING SUPER-RESOLUTION FILM

CROSS-REFERENCE TO RELATED APPLICATIONS

This application is based upon and claims the benefit of priority from the prior Japanese Patent Application No. 2000-092160, filed Mar. 29, 2000, the entire contents of which are incorporated herein by reference.

BACKGROUND OF THE INVENTION

The present invention relates to an optical disk having a super-resolution film.

In recent years, an optical disk, particularly, a digital video disk (DVD), attracts attentions as a recording medium indispensable for information industry, and the market of the optical disk is being enlarged. Such an optical disk, which is a non-contact type, has a high recording density. However, since the capacity of software and program of games and the like is expected to increase without fail, a further improvement in the recording density is required in the optical disk. The most effective method for increasing the density of the optical disk is to diminish a convergence area of laser beam.

One of the methods for diminishing the convergence area of the laser beam is to decrease a wavelength of laser beam. It should be noted in this respect that change from a GaAlInP-based semiconductor laser having a wavelength of 650 nm to a GaN-based semiconductor laser having a wavelength of 400 nm is being made nowadays. In view of the characteristics of GaN, it may be highly reasonable that the wavelength of the semiconductor laser will be further decreased to 350 nm in future.

A super-resolution is considered to provide another method for diminishing the convergence area of laser beam. The concept of the super-resolution will now be described with reference to FIG. 1. Specifically, the optical disk 1 shown in FIG. 1 comprises the recording layer 2 and the super-resolution film 3. Data are recorded in recorded portions 2a. The recording layer 2 is irradiated with a laser beam 4 through the super-resolution film 3. The light intensity in the central portion of the laser beam spot on the super-resolution film 3 is higher than that in the peripheral portion. It should be noted that the super-resolution film 3 permits selectively transmitting the high intensity portion of the laser beam 4, with the result that an aperture smaller than the diffraction limit of the laser beam is formed in the super-resolution film 3. It follows that the recording layer 2 is irradiated with the laser beam 4 having a spot size smaller than the diffraction limit, making it possible to read out the data even if the data are recorded in a high density. In addition, a carrier-to-noise ratio (CNR) for readout from short pits may be improved.

The super-resolution films include a heat-mode type functions through heat and a photon-mode type functions depending only on light power. The heat-mode type super-resolution film varies its transmittance at a high temperature portion in the center of the beam spot with transformation of the film material through melting or composition change. As the photon-mode type super-resolution film, the most promising material is that represents absorption saturation. The absorption saturation phenomenon denotes the phenomenon that, in the case of a high light intensity, the absorption of the super-resolution film is decreased so as to increase the transmittance. This phenomenon is generated under the situation that, in a super-resolution film irradiated with light, electrons are excited to an upper level so as to change light absorption characteristics. To be more specific, when the electrons excited upon irradiation with light are subjected to harmonic oscillation, anharmonic oscillation is induced so as to change the light absorption characteristics and the refractive index of the super-resolution film.

In order to improve the super-resolution characteristics of the super-resolution film utilizing the absorption saturation phenomenon described above, it has been clarified that the material contained in the super-resolution film should desirably exhibit large third-order nonlinear optical characteristics. It has been found that the material having a large third-order nonlinear optical constant includes, for example, a material utilizing π-conjugated or σ-conjugated electrons, a material utilizing metal plasmon, and a material utilizing a semiconductor exciton. Particularly, a material utilizing a semiconductor exciton is being studied extensively.

It is known to the art that, if the dimension of a material utilizing the semiconductor exciton is lowered, it is possible to stabilize the harmonic oscillation of the excited electrons so as to enlarge the anharmonic oscillation, with the result that the third-order nonlinear optical characteristics are enhanced and state density is increased. The low dimensional system includes a super-lattice (two-dimensional), a quantum wire (one-dimensional), and quantum dots formed of nanocrystallites (zero-dimensional). Particularly, it is disclosed in, for example, Japanese Patent Disclosure (Kokai) No. 06-28713 and Japanese Patent Disclosure (Kokai) No. 11-86342 that the semiconductor nanocrystallites are desirable for forming a super-resolution film. The super-resolution films disclosed in these patent specifications are prepared by spin-coating of a dispersion of the semiconductor nanocrystallites and a transparent matrix in a solvent, or by sputtering the semiconductor nanocrystallites.

However, it is desired to further improve the super-resolution characteristics even in a super-resolution film utilizing the semiconductor nanocrystallites so as to increase the recording density of the optical disk.

BRIEF SUMMARY OF THE INVENTION

An object of the present invention is to further improve the super-resolution characteristics in a super-resolution film using semiconductor particles so as to increase the recording density of an optical disk.

According to an aspect of the present invention, there is provided an optical disk from which recorded data are read out by means of light irradiation, comprising: a substrate comprising recording pits as data on a surface thereof; and stacked films formed on the substrate, the films comprising a super-resolution film containing a polymer matrix and semiconductor particles including an organic group covalently bonded thereto, and a reflective film reflecting light, the super-resolution film and the reflective film being provided in this order from a light incident side.

According to another aspect of the present invention, there is provided an optical disk to which data are recorded by means of light irradiation, comprising: a substrate; and stacked films formed on the substrate, the films comprising a super-resolution film containing a polymer matrix and semiconductor particles including an organic group covalently bonded thereto, an optical recording layer to which data are recorded, and a reflective film reflecting light, the super-resolution film, the optical recording layer and the reflective film being provided in this order from a light incident side.

According to still another aspect of the present invention, there is provided an optical disk from which recorded data are read out by means of light irradiation, comprising: a substrate comprising recording pits as data on a surface thereof; and stacked films formed on the substrate, the films comprising a super-resolution film containing a polymer matrix and semiconductor particles, and a reflective film reflecting light, the super-resolution film and the reflective film are provided in this order from a light incident side, and a modal diameter in particle size distribution of the semiconductor particles being not smaller than ¼ and not larger than one times as large as a Bohr radius of an exciton of the semiconductor.

According to yet another aspect of the present invention, there is provided an optical disk to which data are recorded by means of light irradiation, comprising: a substrate; and stacked films formed on the substrate, the films comprising a super-resolution film containing a polymer matrix and semiconductor particles, an optical recording layer to which data are recorded, and a reflective film reflecting light, the super-resolution film, the optical recording layer and the reflective film being provided in this order from a light incident side, and a modal diameter in particle size distribution of the semiconductor particles being not smaller than ¼ and not larger than one times as large as a Bohr radius of an exciton of the semiconductor.

DETAILED DESCRIPTION OF THE INVENTION

The typical structure of an optical disk of the present invention will be described first.

Figure 1:
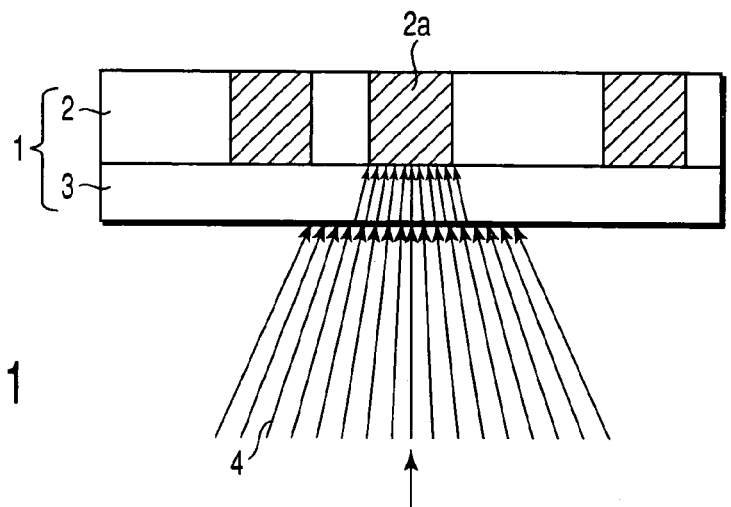
FIG. 1 is a view for describing the concept of super-resolution.
Figure 2:
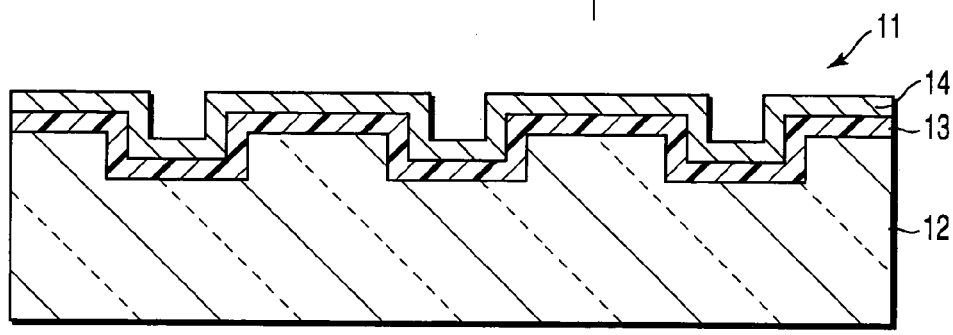
FIG. 2 is a cross sectional view showing an optical disk according to one embodiment of the present invention.

Specifically, FIG. 2 is a cross sectional view showing an optical disk according to one embodiment of the present invention. The optical disk is used as, for example, DVD-ROM or CR-ROM. The optical disk 11 shown in FIG. 2 comprises the transparent substrate 12 made of glass or a plastic material, and pits corresponding to data are formed on the surface of the transparent substrate 12. The super-resolution film 13 and the reflection film 14 made of, for example, aluminum are formed on the transparent substrate 12. The super-resolution film 13 has a structure that semiconductor particles are dispersed in a polymer matrix. The semiconductor particle preferably includes an organic group covalently bonded thereto. The recorded data are reproduced by irradiation with reproducing light 4 coming from the side of the transparent substrate 12 and by reading out the light reflected from the reflection film 14.

In the optical disk shown in FIG. 2, the data are reproduced by reading out change in reflected light. However, it is possible to irradiate the optical disk with reproducing light coming from the side of the transparent substrate 12 and to read out transmitted light on the opposite side.

In recent years, there is proposed an optical disk comprising a reflection film and a super-resolution film that are formed in the inverse order relative to FIG. 2. In this case, the optical disk is irradiated with reproducing light coming from the opposite side of the substrate. In this optical disk, the substrate is not necessarily transparent.

Figure 3:
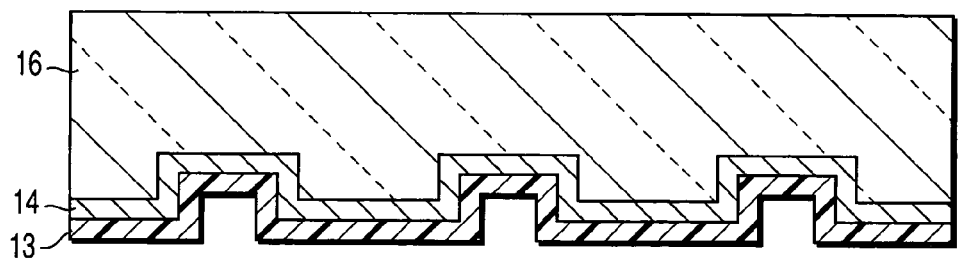
FIG. 3 is a cross sectional view showing an optical disk according to another embodiment of the present invention.

The optical disk 11 shown in FIG. 3 has a structure that the reflection film 14 and the super-resolution film 13 are formed in this order on the substrate 16 made of glass or a plastic material. The recorded data are reproduced by irradiation with reproducing light coming from the opposite side of the substrate 16 and by reading out the light reflected from the reflection film 14. Note that, the data can be reproduced by irradiating the optical disk with reproducing light coming from the opposite side of the substrate 16 and by reading out transmitted light through the substrate 16.

Figure 4:
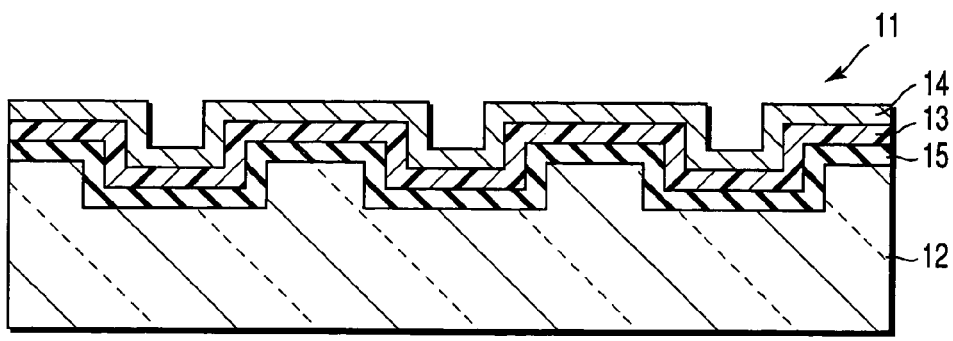
FIG. 4 is a cross sectional view showing an optical disk according to another embodiment of the present invention.

FIG. 4 is a cross sectional view showing an optical disk 11 according to another embodiment of the present invention. The optical disk 11 shown in FIG. 4 comprises a transparent substrate 12 made of glass or a plastic material, the heat radiating film 14 formed on the transparent substrate 12, the super-resolution film 13 formed on the heat radiating film 15, and the reflection film 14 consisting of, for example, aluminum and formed on the super-resolution film 13. This optical disk is differs from that of FIG. 2 in that the heat radiating film 15 is formed between the transparent substrate 12 and the super-resolution film 13.

It is desirable for each of the heat radiating film 15 and the reflection film 14 formed on the both surfaces of the super-resolution film 13 to have a heat conductivity of at least 1 W/m·K. Since the polymer matrix of the super-resolution film 13 has low heat conductivity in many cases, it is possible to perform heat radiation effectively by providing the heat radiating film 15 and the reflection film 14 so as to suppress deterioration of the super-resolution film 13. It is desirable for the heat conductivity of the heat radiating film 15 to be as high as possible. Particularly, if the heat conductivity of the heat radiating film 15 is 10 W/m·K or more, deterioration of the super-resolution film 13 can be suppressed effectively. The heat radiating film having a heat conductivity of at least 1 W/m·K includes, for example, an aluminum thin film, a gold thin film, a copper thin film, an aluminum nitride thin film, and a germanium nitride thin film. It is desirable for the thickness of the heat radiating film to fall within a range of between 1 nm and 100 nm in order to improve the heat radiation effect and to set all the films of the optical disk to fall within the focal depth. Note that, the data can be reproduced by irradiating the optical disk with reproducing light coming from the opposite side of the transparent substrate 12 and by reading out transmitted light through the substrate 12.

Figure 5:
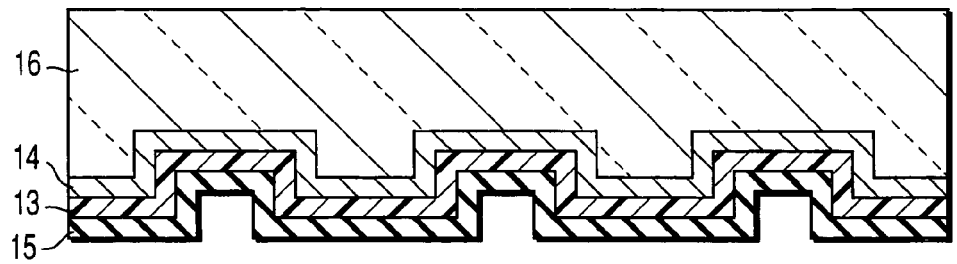
FIG. 5 is a cross sectional view showing an optical disk according to another embodiment of the present invention.

FIG. 5 is a cross sectional view showing an optical disk according to another embodiment of the present invention. The optical disk 11 shown in FIG. 5 has a structure that the reflection film 14, the super-resolution film 13 and the heat radiating film 15 are formed in this order on the substrate 16 made of glass or a plastic material. This optical disk is differs from that of FIG. 3 in that the heat radiating film 15 is formed on the super-resolution film 13. The recorded data are reproduced by irradiation with reproducing light coming from the opposite side of the substrate 16 and by reading out the light reflected from the reflection film 14. Note that, the data can be reproduced by irradiating the optical disk with reproducing light coming from the opposite side of the substrate 16 and by reading out transmitted light through the substrate 16.

In the optical disk shown in each of FIGS. 2 to 5, although data are recorded in the form of pits on the substrate, it is possible to form a recording layer separately from the transparent substrate.

Figure 6:
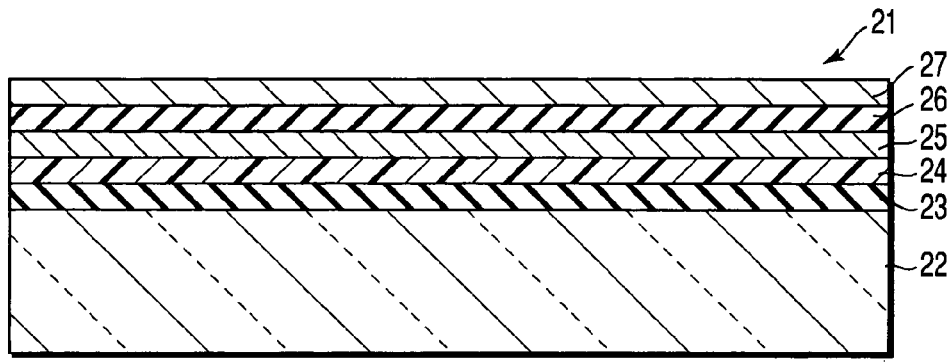
FIG. 6 is a cross sectional view showing an optical disk according to another embodiment of the present invention.

FIG. 6 is a cross sectional view showing an optical disk 21 according to still another embodiment of the present invention. This optical disk is use as, for example, DVD-RAM. The optical disk 21 shown in FIG. 6 has a structure that the dielectric film 23, the super-resolution film 24, the phase change optical recording layer 25, the dielectric film 26 and the reflection film 27 are formed in the order on the transparent substrate 22 made of glass or a plastic material. In this case, the optical disk 21 is irradiated with recording light coming from the side of the transparent substrate 22 so as to bring about phase change between the amorphous state and the crystalline state to perform recording. Also, the optical disk 21 is irradiated with reproducing light coming from the side of the transparent substrate 22 so as to reproduce the recorded data by utilizing the difference in reflectance between the amorphous phase and the crystalline phase.

Optical disks having a similar structure to that of FIG. 6 include DVD-R, DVD-RW, CD-R, CD-RW, MO and the like.

Figure 7:
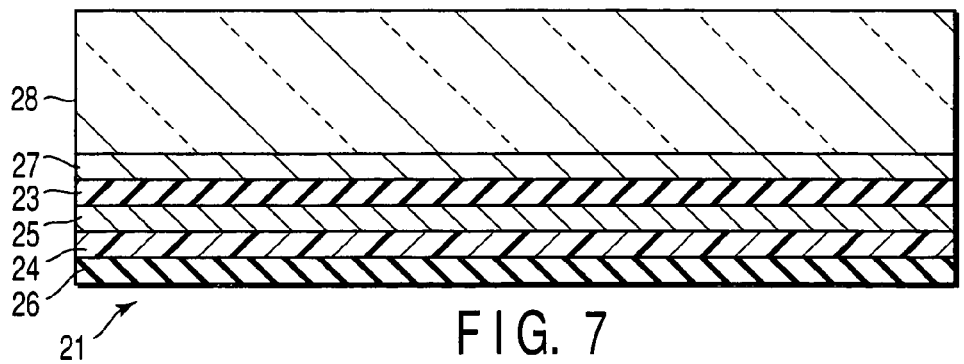
FIG. 7 is a cross sectional view showing an optical disk according to still another embodiment of the present invention.

The optical disk 21 shown in FIG. 7 has a structure that the reflection film 27, the dielectric film 26, the phase change optical recording layer 25, the super-resolution film 24 and the dielectric film 23 are formed in the order on the substrate 28 made of glass or a plastic material. In this case, the optical disk 21 is irradiated with recording light coming from the opposite side of the transparent substrate 28 so as to bring about phase change between the amorphous state and the crystalline state in the phase change optical recording layer 25 to perform recording. Also, the optical disk 21 is irradiated with reproducing light coming from the opposite side of the substrate 28 so as to reproduce the recorded data by utilizing the difference in reflectance between the amorphous phase and the crystalline phase.

It is possible to perform recording by imparting change in optical characteristics such as the refractive index and the absorbance to the recording layer. The recorded data can be reproduced by employing a system adapted for the optical characteristics.

The super-resolution characteristics of the super-resolution film used in the embodiments of the optical disk of the present invention will now be described in detail. The super-resolution characteristics, i.e., the absorption saturation phenomenon, of the super-resolution film containing semiconductor particles are considered to be mainly based on the third-order nonlinear optical characteristics of the semiconductor particles as described below.

The electrons excited within the semiconductor particle upon irradiation with light induce anharmonic oscillation when the excited electrons perform the harmonic oscillation, with the result that the absorption characteristics are changed. The harmonic oscillation denotes the oscillation in which the distance from the center position is proportional to the force for returning back to the center position like the oscillation of a spring. The anharmonic oscillation denotes the oscillation that does not meet the particular relationship given above.

The electronic polarization P of the semiconductor exciton relative to the electric field E of light (electromagnetic wave) can be represented by the formula given below:

$$P = P_0 + \chi^{(1)} \cdot E + \chi^{(2)} \cdot E \cdot E + \chi^{(3)} \cdot E \cdot E \cdot E +$$

where $P_0$ is a statistic polarization, $\chi^{(1)}$ is a linear susceptibility, $\chi^{(2)}$ is a second-order nonlinear susceptibility, and $\chi^{(3)}$ is a third-order nonlinear susceptibility.

Where the optical electric field is weak, the third and higher terms on the right side are diminished, with the result that the formula given above can be represented by $P = P_0 + \chi^{(1)} \cdot E$. This is the formula representing the general absorption. However, where the optical electric field is very strong like a laser beam, the third and higher terms are not rendered negligible, and the nonlinear characteristics are caused to appear.

The wavelength at which absorption is generated differs for each of $\chi^{(1)}$, $\chi^{(2)}$, and the like. Absorption relating to $\chi^{(1)}$ is called linear absorption. Also, absorption relating to $\chi^{(2)}$ is called two-photon absorption. The wavelength of a laser beam used herein is assumed to relate to $\chi^{(1)}$ in the second term of the right side.

Since the semiconductor exciton in the super-resolution film showing absorption saturation has an inversion symmetry macroscopically, the terms relating to $\chi^{(2)}$, $\chi^{(4)}$, $\chi^{(6)}$, etc., are rendered zero. In other words, absorption caused by the semiconductor exciton in the super-resolution film showing absorption saturation is a phenomenon relating mainly to $\chi^{(1)}$, $\chi^{(3)}$, $\chi^{(5)}$, $\chi^{(7)}$, etc. Among the nonlinear susceptibility, the largest influence is given by $\chi^{(3)}$, i.e., the third-order nonlinear optical constant.

To be more specific, if light intensity is low, the excited electronic polarization (magnitude of absorption) can be represented by a linear form. However, if light intensity is increased, a ratio of non-absorptive polarization is increased in proportion to the cube of the electric field. It follows that, if the light intensity is increased, the absorption seems to be saturated. In this case, the absorption saturation phenomenon is rendered prominent with increase in the value of $\chi^{(3)}$.

The operation used in the embodiments of the present invention will now be described. As described above, the absorption saturation phenomenon of the semiconductor particle is considered to be generated on the basis of mainly the third-order nonlinear optical characteristics of the semiconductor exciton. In order to improve the third-order nonlinear optical characteristics, it is important for the semiconductor exciton to be present stably so as to maintain phase coherency.

Semiconductor particles of nanometer order are used for forming the super-resolution film in order to form a quantum well structure of energy for stabilizing the semiconductor exciton. The quantum well structure denotes the structure that a site having a low potential energy is formed in barrier walls having a high potential energy like a well. The semiconductor exciton is stabilized, if confined in the quantum well structure. However, if the barrier is too thin or any level is present between the barrier energy level and exciton energy level in well, or if the barrier is low, the semiconductor exciton is not stabilized so as to give rise to relaxation. Clearly, the state of the barrier is very important for stabilizing the exciton.

The present inventors have found that the excited state of the semiconductor exciton is strongly affected by, for example, the surface state of the semiconductor particle, the particle size distribution of the semiconductor particles, and the phase relaxation time.

Figure 8:
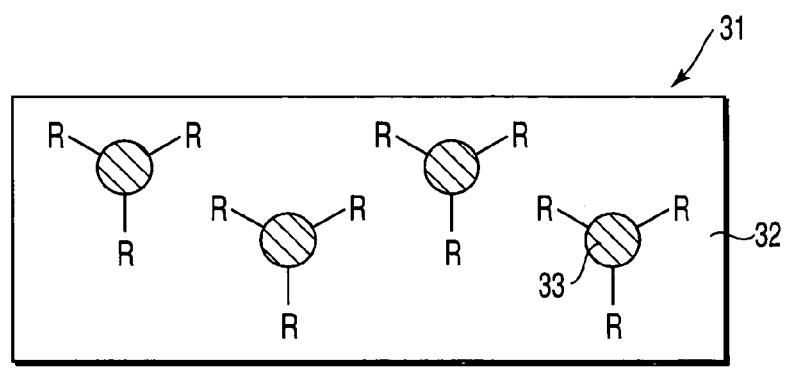
FIG. 8 is a view schematically showing a super-resolution film used in one embodiment of the present invention.

The super-resolution film used in the optical disk of the embodiments of the present invention comprises, for example, a polymer matrix and semiconductor particles having an organic group covalently bonded thereto. FIG. 8 schematically shows such a super-resolution film. The super-resolution film 31 shown in FIG. 8 has a structure that the semiconductor particles 33 having organic groups R covalently bonded to the surface thereof are dispersed in the polymer matrix 32.

Figure 9:
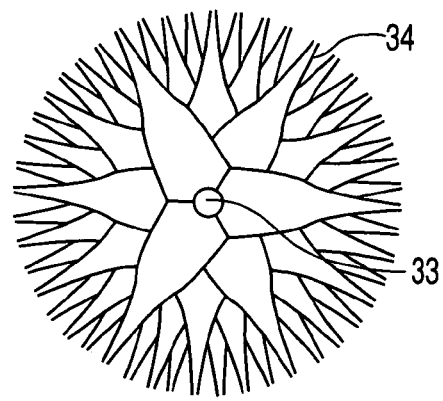
FIG. 9 is a view schematically showing a semiconductor particle covered with a dendrimer, which is used in another embodiment of the present invention.

As shown in FIG. 9, it is possible for the organic group covalently bonded to the surface of the semiconductor particle 33 to be an organic group having a high molecular weight like the dendrimer 34.

Figure 10:
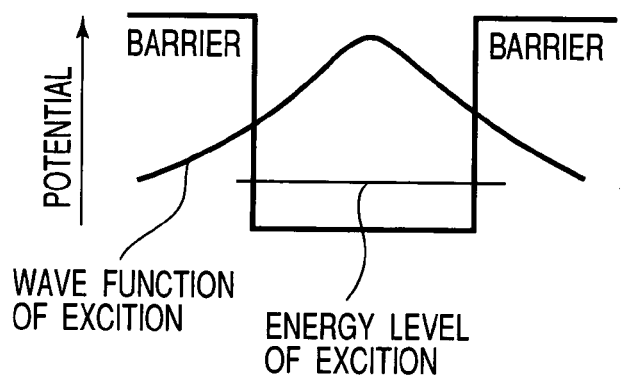
FIG. 10 is a view for describing a quantum well structure in a super-resolution film.

FIG. 10 schematically shows a quantum well structure containing semiconductor excitons in a super-resolution film. As described previously, it is important for the exciton to be present stably in order to bring about absorption saturation. The stabilization of the exciton denotes that the energy is less changed i.e., a long energy relaxation time, and the continuity of the phase is unlikely to be broken, i.e., a long phase relaxation time. Where the third-order nonlinear optical effect is involved in the stabilization of the exciton, i.e., in the case of coherent interaction, the phase relaxation time is important. Therefore, in the quantum well structure shown in FIG. 7, it is important for the barrier to be sufficiently higher than the energy level of the exciton. However, in the case of the semiconductor nanocrystallites, the barrier height varies depending on the surface state and the interface state with the surrounding material. Where the barrier height is lower than the energy level of the exciton wave function, or where the impurity level is formed lower than the energy level of the exciton wave function, the energy relaxation is promptly caused when the exciton wave function is penetrated to the outside of the quantum well, and thus it is impossible for the exciton to be stably present for a long time.

In the super-resolution film according to the present invention, a zero-dimensional quantum well structure is formed because semiconductor particles are dispersed in a transparent polymer matrix. Also, the organic group covalently bonded to the surface of the semiconductor particle forms a high energy level, but does not form an impurity level or an interfacial level. As a result, it is possible to form an excellent quantum well structure having a high barrier height. It follows that the semiconductor exciton is further stabilized, leading to increase in $\chi^{(3)}$ of the exciton and improvement in the super-resolution characteristics of the super-resolution film.

The semiconductor particle comprises at least one semiconductor selected from the group consisting of CdS, CdSe, $CdS_xSe_{1-x}$, ZnSe, ZnS, $ZnS_xSe_{1-x}$, $Cd_xZn_{1-x}Se$, GaN, $Ga_xIn_{1-x}N$, ZnO, CuCl, $HgI_2$, and $PbI_2$, where x, which is a crystal mixing ratio, is larger than 0 and smaller than 1, i.e., $0<x<1$. Since a light source wavelength of 350 nm to 450 nm is assumed to be used in the optical disk apparatus of the next generation, it is particularly desirable to use, for example, CdS, CdSe, $CdS_xSe_{1-x}$, CuCl and GaN as the semiconductor, which have excitonic absorption in the wavelength range of 350 nm to 450 nm.

It is preferable that the organic group covalently bonded to the surface of the semiconductor particle forms a high energy level. From this point of view, it is preferable that the organic group is neither electron-withdrawing nor electron-donating, and thus an alkyl group, which has low polarity, such as methyl, ethyl, propyl, etc., is suitable. Also, it is preferable that a halogen content of the organic group is as low as possible not so as to form an interfacial level. The halogen content strongly affects probability that the exciton transfers to the outside of the quantum well, i.e., scattering cross-section. Therefore, the halogen content is preferred to be 1 mol % or less in order to exert super-resolution effect sufficiently. The halogen content can be measured by chromatographic mass spectrometry, atomic absorption spectrophotometry, SIMS, fluorescent X-ray analysis, elemental analysis, etc.

Specific organic groups are as follows: Saturated chain hydrocarbon group such as methyl, ethyl, propyl, isopropyl, butyl, isobutyl, s-butyl, t-butyl, pentyl, isopentyl, neopentyl, t-pentyl, 1-methylbutyl, 1-methylheptyl, dodecyl, hexadecyl, octadecyl, ethylene, ethylidene, propylene and isopropylidene; unsaturated chain hydrocarbon group such as vinyl, allyl, 1-propenyl, isopropenyl, 1-butenyl, 2-butenyl, 2-methylallyl, ethynyl and 2-propynyl; alicyclic hydrocarbon such as cyclohexyl, 1-cyclohexenyl and cyclohexylidene; aromatic hydrocarbon such as tolyl, xylyl, cumenyl, phenethyl, α-methylbenzyl, 1-methyl-1-phenylethyl, diphenylmethyl, styryl, cinnamyl, benzylidene, p-phenylene, 4-methyl-m-phenylene, p-xylene-α, α'-diyl, 4-biphenyl, 9-anthryl and 2-phenanthryl; oxygen-containing characteristic group such as hydroxy, hydroperoxy, oxy, dioxy and oxo; ether group such as methoxy, ethoxy, propoxy, butoxy, pentyloxy, phenoxy and benzyloxy; ester group such as acetoxy and benzoyloxy; acyl group such as acetyl, propionyl, butyryl, isobutyryl, valeryl, hexanoyl, octanoyl, decanoyl, lauroyl, palmitoyl, stearoyl, acryloyl, methacryloyl, chloroformyl, oxalo, oxalyl, malonyl, succinyl, cyclohexanecarbonyl, p-toluoyl, phthaloyl and terephthaloyl; oxygen-containing complex group such as hydroxymethyl, acetonyl, phenacyl, p-methoxyphenyl, p-anisyl and p-anisoyl; nytrogen-containing characteristic group such as animo, nitrilo, acetamide, benzamide, succinimide, phthalimide, carbamoyl, cyano, isocyanato, diazo, diazonio, hydrazino, phenylazo, ureido and ureylene; sulfur-containing characteristic group such as methylthio, methylthiomethyl, thioxo, benzenesulfonyl, p-toluenesulfonyl, sulfamoyl and isothiocyanato; heterocyclic group such as 2-furyl, furfuryl, 2-furoyl, 2-thienyl, 2-thenyl, 2-thenoyl, 1-pyrrolyl, 1-pyrrolidinyl, 2-pyridyl, piperidinyl, 4-piperidinyl, morpholino, 2-morpholinyl and 2-quinolyl.

It is also possible to use as the organic group a residual moiety of a silane compound such as aminopropyltriethoxysilane (AMEO) or a residual moiety of a thiol compound such as 3-mercapto-1,2-propanediol. Further, it is possible to use as the organic group a residual moiety of a large organic molecule such as a dendrimer can be used as the organic group.

A polymer material forming the matrix surrounding the semiconductor particles, which is desirably used in embodiments of the present invention, includes polymethyl methacrylate (PMMA), polystyrene, polycarbonate, polyvinyl alcohol, polyacetal, polyacrylate, and polytetrafluoroethylene, though the polymer material is not particularly limited. It is also possible to use as the matrix a polymer generated through polymerization reaction of an organic compound used for reaction with semiconductor particles described herein later. Similarly, a dendrimer can be used as the matrix. It is desirable for the polymer to have a high melting point, e.g., not lower than 100° C., and to be capable of containing semiconductor particles in a high concentration. On the other hand, it is undesirable to use as a matrix material an inorganic material such as glass because a large number of impurity levels are formed in the inorganic material.

The polymer matrix surrounding the semiconductor particles may form an impurity level because of, for example, folding of the main chain. Such being the situation, it is desirable for the semiconductor particles and the polymer matrix not to be covalently bonded to each other. The number of atoms on the surface of the semiconductor particle that are covalently bonded with the polymer affects probability that the exciton transfers to the outside of the quantum well, i.e., scattering cross-section. Therefore, the ratio of the above number of atoms to the total atoms on the surface of the semiconductor particle is preferably at most 1 mol %. The value can be measured by NMR or XPS.

In order to obtain semiconductor particles having organic groups covalently bonded to the surface thereof, it is desirable to synthesize chemically the semiconductor particles by any of the methods described in, for example, F. Gindele et al., Appl. Phys. Lett., 71, 2181 (1997); K. Sooklal et al., Adv. Marer., 10, 1083 (1998); N. Herron et al., J. Am. Chem. Soc., 112, 1322 (1990); and D. L. Ou et al., Phy. Chem. Grasses., 39, 154(1998).

Use of these methods is effective for making the particle size distribution of the semiconductor particles uniform in synthesis process. The super-resolution film containing semiconductor particles having a uniform particle size distribution exhibits a prominent absorption saturation phenomenon.

Dendrimer is a dendritic molecule having a molecular structure that a plurality of organic groups having a branched structure are bonded to each other to form a dendritic structure. To be more specific, an organic group having a branched structure, e.g., Y-shaped branched structure, is bonded to an organic group having a branched structure, e.g., a Y-shaped branched structure, which is covalently bonded to the semiconductor particle forming the nucleus. Further, another organic group having a branched structure, e.g., a Y-shaped branched structure, is bonded to the resultant organic group having a branched structure, e.g., a Y-shaped branched structure. In this fashion, a plurality of organic groups each having a branched structure are bonded to each other to form a dendrimer having a dendritic structure.

If defined more strictly, dendrimer represents a molecular structure in which it is possible to specify the focal point, i.e., the initiating point of the branching, and, where the molecular chain is traced from the focal point toward the molecular terminal, there is at least one molecular terminal passing through at least one branched point other than the focal point. Also, the focal point represents the origin of the fractal structure providing the basis of the dendritic molecule.

The semiconductor particle covalently bonded to dendrimer is unlikely to be decomposed by the outer environment and, thus, is stable. Also, since dendrimer is capable of surrounding the semiconductor particle with a uniform film thickness, the particle diameters of the semiconductor particles can be made constant in synthesizing the semiconductor particles.

The semiconductor particles having dendrimer covalently bonded thereto can be manufactured by, for example, any of first to third methods described below.

The first method is a method in which the synthesizing reaction is carried out in a solution capable of forming semiconductor particles in the presence of an organic compound of a dendritic structure having an atom capable of reaction with the semiconductor particle.

The second method is a method in which an organic compound that does not have a dendritic structure is modified by an aimed semiconductor molecule by an organic bond, followed by activating the modified molecule by means of, for example, halogenation so as to grow the dendritic structure.

The third method is a method in which semiconductor particles are synthesized in advance, followed by modifying the semiconductor particles in the presence of an organic compound having a dendritic structure and containing an atom capable reaction with the semiconductor particles.

Among the first to third methods described above, it is desirable to employ the first method because the first method is simple and can be carried out easily. It is possible to use any kind of organic compound having the dendritic structure as far as the dendritic organic compound has a site capable of reaction with the semiconductor particles. It is desirable for the element capable of reacting with the semiconductor particle to be introduced stably into the focal point. To this end, it is desirable to use dendron synthesized by a so-called "convergent" method. To be more specific, it is possible to use dendritic organic compounds described in "DENDRITIC MOLECULES: CONCEPTS, SYNTHESES, PERSPECTIVES", by NEWKOME, G. R.; MOOREFIELD, C. N.; VOGTLE, MF.; Published by VCHYY: 1996: Germany IS:ISBN:3-527-29325-6.

To be more specific, in order to obtain the desired function of the present invention, it is desirable to use, for example, a compound having the chemical structure shown in chemical formula (1) or (2) given below.

The compound having the chemical structure of chemical formula (1) has a fractal structure in which a two-way branched unit of an oxybenzylene unit is repeated, and can be regarded as a third generation structure of oxybenzylene. The fractal structure is repeated up to the fifth generation in the compound having a chemical structure shown in chemical structure (2). In addition to these structures, it is possible to use a structure prepared by introducing a substituted structure of an organic group or a pyrogallol derivative into benzylene of these compounds as a three-way branched repeating unit in place of the two-way branched repeating unit. Also, the outermost structure is modified by methyl groups in the structures shown in chemical formulas (1) and (2). However, it is possible to introduce any organic group, as required.

11
(1)
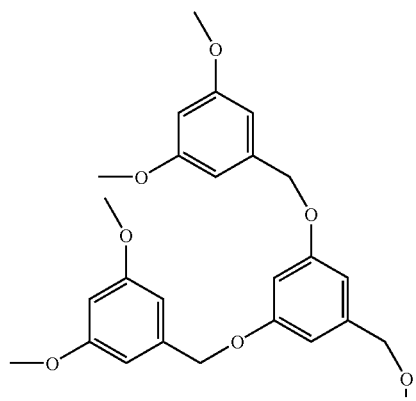
12
-continued
(2)
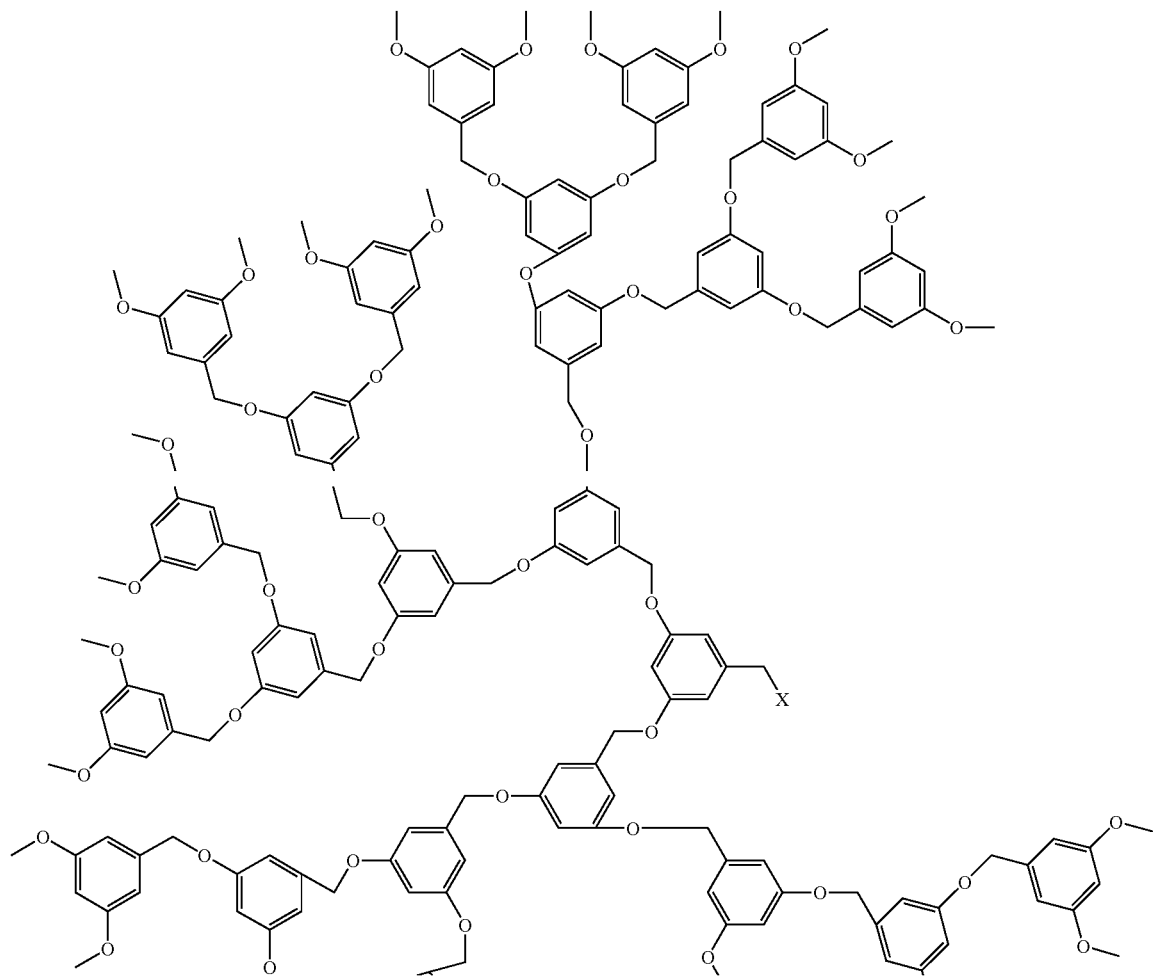

-continued

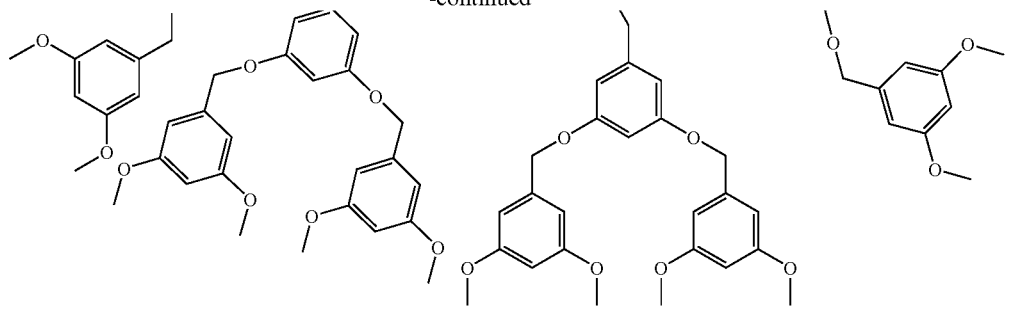

In the chemical formulas (1) and (2), X represents a monovalent group. It is possible for X to be group as far as the group exhibits reactivity with the semiconductor particle. To be more specific, X includes, for example, a hydroxyl group, halogen, SH and SeH.

In order to maintain a suitable distance between the centers of the adjacent semiconductor particles, it is desirable for the organic compound having the dendritic structure to have repeating periods of at least three generations.

It is desirable to prepare the super-resolution film by spin-coating a disk substrate with a mixture containing semiconductor particles, the matrix material and a solvent, followed by drying the coating, because this method can be carried out easily. For applying the spin-coating, it is necessary to dissolve the matrix material in the solvent such that the coating can be performed in a desired thickness. It is also possible to prepare the super-resolution film by vapor deposition of the matrix and the semiconductor particles. For example, Teflon used as the matrix, which is certainly strong against heat, cannot be used for spin-coating. In this case, Teflon can be subjected to the vapor deposition together with the semiconductor particles.

As described previously, the absorption saturation phenomenon is rendered prominent with increase in the third-order nonlinear optical constant $\chi^{(3)}$. The third-order nonlinear optical constant $\chi^{(3)}$ (third-order nonlinear susceptibility) in the case of the semiconductor particles can be represented by the equation (I) given below:

$$\chi^{(3)} = \frac{-N\mu^4}{\omega - \omega_0 + i\Gamma} \left[ \frac{2\Gamma}{\gamma} \frac{1}{(\omega_0 - \omega)^2 + \Gamma^2} + \frac{2}{i\gamma} \left( \frac{1}{\omega_0 - \omega_1 - i\Gamma} + \frac{-1}{\omega_0 - \omega_1 + i\Gamma} \right) \right] \quad (I)$$

where $\mu$ represents the magnitude of the transition dipole moment (absorption), $\omega_0$ represents the angular frequency of the energy level, $\omega$ represents the angular frequency of the laser light, $\Gamma$ represents the phase relaxation (lateral relaxation) constant (reciprocal of the phase relaxation time), $\gamma$ represents the energy relaxation (vertical relaxation) constant (reciprocal of the energy relaxation time), and N represents the unit cell density.

The value of $\omega_0$ is changed depending on the particle size. Therefore, if the particle size distribution is wide, the number of particles having $\omega_0$ deviating from the angular frequency $\omega$ of the laser beam is increased. The value of $\chi^{(3)}$ is diminished with increase in the difference between $\omega_0$ and $\omega$ of the particle, with the result that the value of $\chi^{(3)}$ is diminished as a whole. It follows that the absorption saturation phenomenon is rendered prominent if the particle distribution of the semiconductor particles is narrowed.

In order to improve the super-resolution characteristics of the super-resolution film, it is desirable for the full width at half maximum of the distribution of the particle size (excluding the organic group) of the semiconductor particles to be not larger than the modal diameter. The particle size distribution in this case relates to semiconductor particles that absorbs reproducing light wavelength and excludes semiconductor particles that does not absorb reproducing light wavelength. Any method can be employed for obtaining semiconductor particles having the particle size distribution falling within a predetermined range. For example, it is preferable to use a method of chemically synthesizing the semiconductor particles. It is also possible to employ a vapor phase synthesis such as vapor deposition.

If the modal diameter in the particle size distribution of the semiconductor particles forming the super-resolution film is not smaller than ¼ and not larger than 1 times as large as the Bohr radius of the exciton, it is possible to markedly improve the super-resolution characteristics. If the number of semiconductor particles larger than the Bohr radius of the semiconductor exciton is increased, the energy is changed depending on whether the semiconductor exciton is present in the central portion of the semiconductor particle or in the vicinity of the barrier. As a result, $\omega_0$ is changed, and the phase is also changed by the collision against the barrier, resulting in failure to exhibit high super-resolution characteristics. By contraries, if the number of semiconductor particles smaller than ¼ of the Bohr radius of the semiconductor exciton is increased, the leakage of the wave function of the semiconductor exciton is increased, with the result that the energy of the exciton tends to be transferred easily into the impurity level present in the surrounding region. As a result, the phase relaxation constant and the energy relaxation constant are increased so as to diminish the value of $\chi^{(3)}$.

The values of the Bohr radius of various materials are recited in, for example Landlt-börnstein, Numerical Data and Functional Relationship in Science and Technology, II-VI Compounds, New Series III 17b. The Bohr radius $D_{Bohr}$ is represented by the following equation:

$$D_{Bohr} = a_B(m/\mu)\in$$

where $a_B$ denotes the Bohr radius of hydrogen atom, m denotes mass of free electron, $\mu$ denotes reduced effective mass, wherein $1/\mu = 1/m_e + 1/m_h$ ($m_e$ is mass of electron and $m_h$ is mass of hole), and $\in$ denotes dielectric constant.

Also, it is desirable that the semiconductor particles having a particle size not small than ¼ and not larger than one times as large as the Bohr radius of exciton of the semiconductor are contained at a rate of at least 50% by volume, preferably at least 70% by volume, and more preferably at least 80% by volume of all semiconductor particles.

As described above, if the semiconductor exciton is present stably and if the state of phase is stable, the third-order nonlinear optical characteristics of the semiconductor particles are improved. When the semiconductor exciton is under a stable state, exciton emission is observed from the semiconductor particles, and an emission life, which is equal to an energy relaxation time, tends to be prolonged. It follows that a prominent absorption saturation phenomenon can be exhibited if semiconductor particles, in which the exciton emission can be observed and which has the energy relaxation time of at least 50 psec, further at least 500 psec, are used for forming the super-resolution film. Equation (I) given previously indicates that the third-order nonlinear optical constant $\chi^{(3)}$ is increased with increase in the energy relaxation time, i.e., the reciprocal of $\gamma$.

The energy relaxation time, i.e., the emission life can be measured by a time resolved single photon counting method or by using a streak camera or an oscilloscope. In the time resolved single photon counting method, measured are a rising time of photoelectrons generated by accepting light pulses emitted in a reference time and a rising time of photoelectrons generated by accepting emission that is decreased in light intensity by a photon counting level, which measurements are repeated and integrated. In this method, the time measurement is performed with an apparatus called TAC (time to amplitude converter), which starts to store electricity by a start-up pulse and stops to store electricity by a stop pulse. The streak camera is an apparatus that applies a field, of which value is varied with time, to photoelectrons generated by accepting emission. The applied field is changed in accordance to a time within which photons are generated, and thus a traveling distance of photoelectrons by the field is varied. Therefore, the traveling distance corresponding to the time. The streak camera is often combined with a spectroscope, which combination provides two-dimensional data between time and wavelength.

The exciton emission is observed by a spectrofluorometer, or a system of a spectrophotometer and a photomultiplier tube.

Figure 11:
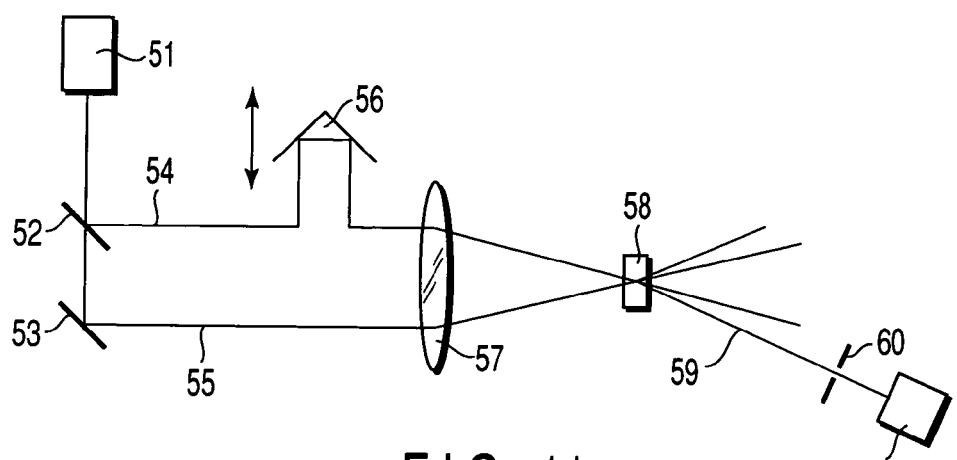
FIG. 11 schematically shows a measurement apparatus of a phase relaxation time of a super-resolution film.

In order to improve the super-resolution characteristics by increasing the third-order nonlinear characteristics of the super-resolution film, it is desirable for the phase relaxation time of the semiconductor particles to be not shorter than 0.5 fsec ($0.5 \times 10^{-15}$ sec). The phase relaxation time of the semiconductor particles can be observed by a transient degenerated four-wave mixing method. FIG. 11 shows a measuring apparatus of the phase relaxation time by the transient degenerated four-wave mixing method. The phase relaxation time corresponds to a full width at half maximum of an absorption peak of exciton that has a value of 0.65 eV. The full width at half maximum of an absorption peak of exciton is measured by absorptiometry. The absorptiometry is a method that measures absorbance at a particular wavelength photoelectrically to determine a concentration based on Beer's law. In order to measure absorbance, a spectrophotometer or a filtered photometer is used.

As shown in FIG. 11, the laser light having a pulse width of femtoseconds (fsec), which is emitted from the mode lock laser 51, is divided with the half mirror 52 into the probe light 54 and the pump light 55. Optical paths of the probe light 54 and the pump light 55 are made different by allowing the probe light 54 to be reflected with the mirror 56.

The mirror 56 is controlled with a piezoelectric element, which controls degree of delay of the probe light 54. Further, these two light beams are collected with a lens 57, and the sample 58 (super-resolution film) is irradiated with these two light beams. If the sample 58 has the third-order nonlinear characteristics, the signal light 59 derived from the third-order nonlinear optical constant is generated. The electronic polarization takes place in the semiconductor exciton by the first light irradiation. However, within a phase relaxation time $\tau_2$, the signal light 59 is generated by interference between the electrons whose phase is not relaxed and the electrons excited by later light irradiation. Since the speed of light in air is $3 \times 10^{-8}$ m/sec, the phase relaxation time of 1 fsec corresponds to the change in the optical path of 0.3 μm. The phase relaxation time is measured by monitoring the signal light with the detector 61 via the aperture 60 while changing the difference in the optical path between these two laser beams. Where the pulse width of the laser light is longer than the phase relaxation time, the phase relaxation time is calculated from the pulse shape of the laser light by deconvolution.

The phase relaxation time and the emission life that are described above are strongly related the third-order nonlinear optical constant. Materials capable of exhibiting super-resolution effect have 0.5 fsec or more of phase relaxation time, 0.66 eV or less of full width at half maximum in excitonic absorption, and 50 psec or more of emission life. Also, suitable combinations of semiconductor particles and any of the organic group to be covalently bonded thereto, the particle size distribution, the modal diameter, the phase relaxation time, the energy relaxation time and the full width at half maximum in excitonic absorption bring about an excellent super-resolution effect.

EXAMPLES

Various measurements were carried out in the following examples as follows.

The particle size distribution of the semiconductor particles was obtained by observing the semiconductor particles with a transmission electron microscope (TEM) so as to measure the particle diameters. Incidentally, the diameter of the semiconductor particle does not include the organic group on the surface thereof. The modal diameter ($D_{mod}$) and the full width at half maximum (FWHM) were obtained from the resultant particle size distribution.

The wavelength at absorption peak of exciton was obtained by measuring the absorption spectrum of the super-resolution film with a spectroscope.

The presence or absence of the absorption saturation phenomenon of the super-resolution film was examined by measuring the transmittance as follows. Specifically, prepared was a light source emitting a laser beam having a wavelength conforming with the absorption peak of exciton. Then, the operations of irradiating the super-resolution film with laser beams so as to measure the transmittance were carried out with varying the intensity of the laser beam. To be more specific, the transmittance was measured by setting the power density of the laser beam at 100 kW/cm$^2$ or 1 MW/cm$^2$. It was judged that the saturation absorption phenomenon was recognized when increase in transmittance was recognized when the film is irradiated with the laser beam of a high intensity, compared with the irradiation with the laser beam of a low intensity.

The results of Samples 1A to 1D given below are shown in Table 1.

Sample 1A:

CdS nanocrystallites were formed as follows by a method similar to that described in F. Gindele et al., Appl. Phys. Lett. 71, 2181 (1997).

Specifically, cadmium ethoxyacetate was prepared by refluxing cadmium acetate dihydrate, followed by drying to obtain powder. The powder was dissolved in 2-butoxy ethanol, followed by adding aminopropyltriethoxy-silane ($NH_2C_3H_6Si(OC_2H_5)_3$, hereinafter referred to as AMEO) to the resultant solution. Bis(trimethylsilyl) sulfide was added to the resultant solution under an argon gas atmosphere and the resultant mixture was subjected to reflux so as to obtain a composition containing semiconductor particles.

In the composition, semiconductor particles of CdS nanocrystallites having an AMEO residual moiety covalently bonded at an amino-terminated end to the surface thereof were dispersed in the matrix of AMEO polymer.

The particle size distribution was obtained by measuring the particle diameters of the semiconductor particles excluding the AMEO. As a result, the modal diameter ($D_{mod}$) was found to be 2.8 nm, and the full width at half maximum (FWHM) was found to be 3.2 nm.

A quartz glass was coated with the resultant composition to form a super-resolution film having a thickness of about 100 nm. The absorption spectrum of the super-resolution film was observed, finding that the wavelength at absorption peak of exciton was about 400 nm. The presence or absence of the absorption saturation phenomenon was examined by measuring the transmittance of the super-resolution film. For measuring the transmittance, used was a second harmonic wave (SHG) (wavelength of 400 nm) of a Ti:sapphire laser excited by a Q-switching pulsed YAG laser in conformity with the wavelength at absorption peak of exciton.

Figure 12:
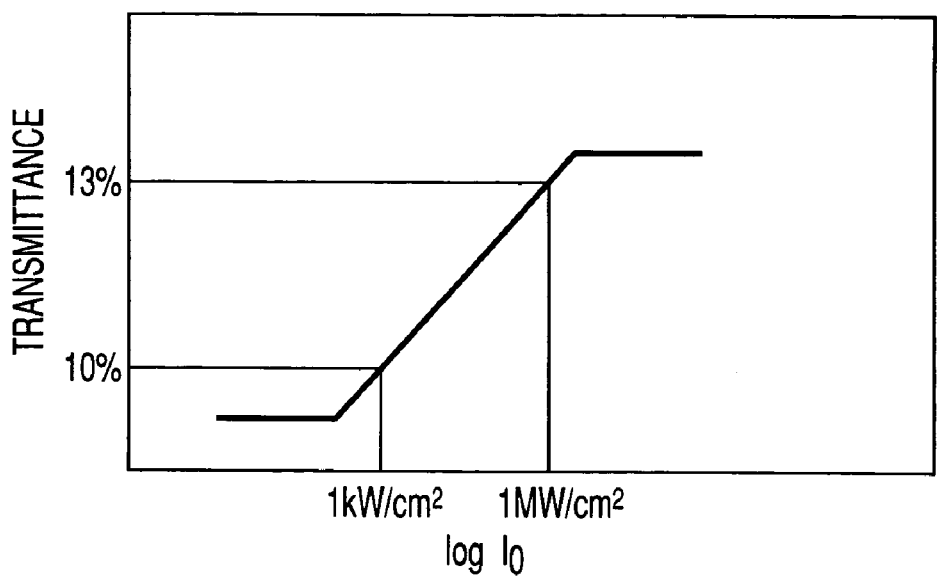
FIG. 12 is a graph showing the relationship between transmittance and incident light intensity in the super-resolution film for Sample 1A.

FIG. 12 is a graph showing the dependency of the transmittance T on the incident light intensity $I_0$ (logarithmic scale) in respect of the super-resolution film for Sample 1A. As shown in the graph, the transmittance values were about 10% under the power density of 100 kw/cm$^2$ and about 13% under the power density of 1 MW/cm$^2$, supporting that the transmittance is increased with increase in the incident light intensity. This indicates that the super-resolution film exhibited absorption saturation characteristics.

It is known that the CdS exciton Bohr radius is 2.8 nm. Therefore, the ratio of the modal diameter ($D_{mod}$) to the exciton Bohr radius ($D_{Bore}$) is about 1.

Sample 1B:

The operation for obtaining a composition containing semiconductor particles was carried out substantially as in Sample 1A, except that, when bis(trimethylsilyl) sulfide was added to the 2-butoxy ethanol solution containing the reactants, the solution was cooled with dry ice/ethanol and the solution was sufficiently stirred. Then, reflux was conducted by controlling the temperature at 165° C.±0.5° C. These operations were carried out in an attempt to make uniform the particle diameters of the semiconductor particles. A composition containing semiconductor particles was obtained as in Sample 1A except for the operations described above.

In the composition, semiconductor particles of CdS nanocrystallites having an AMEO residual moiety covalently bonded at an amino-terminated end to the surface thereof were dispersed in the matrix of AMEO polymer. The semiconductor particles were found to have the modal diameter ($D_{mod}$) of about 2.8 nm, and the full width at half maximum (FWHM) of about 2.8 nm.

Also in this sample, the ratio of the modal diameter ($D_{mod}$) to the exciton Bohr radius ($D_{Bore}$) is about 1. In addition, this sample exhibited 1.94 fsec of phase relaxation time, 0.17 eV of full width at half maximum in excitonic absorption and 600 psec of emission life.

A super-resolution film having a thickness of about 100 nm was formed by coating a quartz glass with the resultant composition, and the absorption spectrum and the transmittance were measured as in Sample 1A. The transmittance values thus measured indicated absorption saturation characteristics.

However, in the case where hydrochloric acid was mixed in the composition when a quartz glass was coated with the composition, the resultant film did not exhibit absorption saturation characteristics. Chloride content of the film measured by elemental analysis was about 2 atomic percent.

Sample 1C:

A composition containing semiconductor particles was obtained as in Sample 1A, except that zinc acetate dihydrate was used as the raw material in place of cadmium acetate dihydrate.

In the composition, semiconductor particles of ZnS nanocrystallites having an AMEO residual moiety covalently bonded at an amino-terminated end to the surface thereof were dispersed in the matrix of AMEO polymer. The semiconductor particles were found to have the modal diameter ($D_{mod}$) of 1.5 nm, and the full width at half maximum (FWHM) of 1.2 nm.

A super-resolution film having a thickness of about 100 nm was formed by coating a quartz glass with the resultant composition, and the absorption spectrum was measured. The wavelength at exciton absorption peak of the super-resolution film was found to be 280 nm. For measuring the transmittance of the super-resolution film, used was SHG (wavelength of 280 nm) of a dye laser excited by SHG of a Q-switching pulsed YAG laser in conformity with the wavelength at absorption peak of exciton. The transmittance values thus measured indicated the absorption saturation characteristics.

Sample 1D:

A film having a thickness of about 300 nm was formed on a quartz glass by co-sputtering using a CdS target and a SiO$_2$ target. The sputtering powers were 200 W for CdS and 500 w for SiO$_2$. The deposition rates under these conditions were found to be 4.5 nm/min for CdS and 3.8 nm/min for SiO$_2$.

In the film thus obtained, semiconductor particles of CdS nanocrystallites were dispersed in the SiO$_2$ matrix. The film was observed with TEM so as to examine the particle diameter of the semiconductor particles to obtain the particle size distribution. As a result, the modal diameter ($D_{mod}$) was found to be 5 nm, and the full width at half maximum (FWHM) was found to be 6 nm. Analysis by XPS revealed that CdS crystallites were covalently bonded with SiO$_2$. The ratio of covalently bonded atoms to the total atoms on the surface of the CdS crystallite was about 20 mol % or more.

The absorption spectrum of the film was measured, finding a shoulder in the vicinity of wavelength of 500 nm. For measuring the transmittance of the film, used was a dye laser (wavelength of 500 nm) excited by a third harmonic wave (THG) of a Q-switching pulsed YAG laser. The absorption saturation characteristics were evaluated on the basis of the measurement of the transmittance. In this case, a change in the transmittance accompanying the change in the laser beam intensity was not recognized.

TABLE 1

| | Super-resolution film | | | | | | Absorption saturation characteristics | |
|---|---|---|---|---|---|---|---|---|
| | Semiconductor particles | | | | | | T | |
| Sample | S | R | $D_{mod}$ | FWHM | M | $A_{max}$ | λ | 100 kW/cm² | 1 MW/cm² |
| 1A | CdS | AMEO | 2.8 nm | 3.2 nm | AMEO polymer | 400 nm | 400 nm | 10% | 13% |
| 1B | CdS | AMEO | 2.8 nm | 2.8 nm | AMEO polymer | 400 nm | 400 nm | 10% | 16% |
| 1C | ZnS | AMEO | 1.5 nm | 1.2 nm | AMEO polymer | 280 nm | 280 nm | 10% | 16% |
| 1D | CdS | — | 5 nm | 6 nm | SiO₂ | ≈500 nm (shoulder) | 500 nm | no change | |

S represents a semiconductor.
R represents an organic group covalently bonded to a semiconductor particle.
$D_{mod}$ represents a modal diameter of semiconductor particles.
FWHM represents full width at half maximum in particle diameter distribution.
M represents a matrix.
$A_{max}$ represents a wavelength at an exciton absorption peak.
λ represents a wavelength of irradiated laser beam.
T represents transmittance of super-resolution film.

Table 1 shows that the super-resolution film formed such that semiconductor particles including an organic group covalently bonded to the surface thereof are dispersed in a polymer matrix exhibits prominent absorption saturation characteristics, as apparent from the comparison between Samples 1A to 1C and Sample 1D. It is also seen that a super-resolution film, in which the FWHM in the particle size distribution of the semiconductor particles is not larger than the modal diameter, exhibits prominent absorption saturation characteristics, as apparent from the comparison between Samples 1B, 1C and Sample 1A.

The results of Samples 2A to 2F given below are shown in Table 2.

Sample 2A:

A composition containing semiconductor particles was obtained as in Sample 1A, except that bis(trimethylsilyl) selenide was used as a raw material of the semiconductor particles in place of bis(trimethylsilyl) sulfide, and that ethanol was used as a solvent in place of 2-butoxy ethanol. Temperature control was not performed during synthesis of the semiconductor particles.

In the resultant composition, semiconductor particles of CdSe nanocrystallites having AMEO covalently bonded at an amino^terminated end to the surface thereof were dispersed in the matrix of AMEO polymer.

The particle diameters of the semiconductor particles, excluding AMEO, were examined so as to obtain the particle size distribution. The semiconductor particles were found to have the modal diameter ($D_{mod}$) of 1.6 nm. Based on the known CdSe exciton Bohr radius ($D_{Bohr}$) of 4.9 nm, the ratio of the modal diameter to the Bohr radius, i.e., $D_{mod}/D_{Bohr}$, was about 0.3.

A super-resolution film having a thickness of about 100 nm was formed by coating a quartz glass with the resultant composition. The absorption spectrum of the super-resolution film was measured, finding that the wavelength at absorption peak of exciton was about 405 nm. Also, the presence or absence of the absorption saturation phenomenon was examined by measuring the transmittance of the super-resolution film. For measuring the transmittance, used was SHG (wavelength of 405 nm) of a continuous wave (CW) Ti:sapphire laser in conformity with the wavelength at absorption peak of exciton. The transmittance values were found to be about 10% under a power density of 100 kW/cm² and about 16% under a power density of 1 MW/cm², supporting that the transmittance was increased with increase in the incident light intensity. This supports that the super-resolution film exhibits absorption saturation characteristics.

Sample 2B:

Prepared as the semiconductor particles were $CdS_{0.1}Se_{0.9}$ nanocrystallites having a modal diameter of 1.0 nm. Since the $CdS_{0.1}Se_{0.9}$ exciton Bohr radius is 4.7 nm, the ratio of the modal diameter to the Bohr radius, i.e., $D_{mod}/D_{Bohr}$, is 0.21.

The semiconductor particles were dispersed in a solvent together with PMMA forming a matrix, and a quartz glass was spin-coated with the resultant dispersion so as to form a super-resolution film having a thickness of about 100 nm. The absorption spectrum of the super-resolution film thus formed was measured, finding that the wavelength at absorption peak of exciton was about 400 nm. For measuring the transmittance of the super-resolution film, used was SHG (wavelength of 400 nm) of a CW Ti:sapphire laser in conformity with the wavelength at absorption peak of exciton. The absorption saturation characteristics were evaluated based on transmittance measurements.

Sample 2C:

Prepared as the semiconductor particles were $CdS_{0.1}Se_{0.9}$ nanocrystallites having a modal diameter of 1.3 nm. In this case, the ratio of the modal diameter to the Bohr radius, i.e., $D_{mod}/D_{Bohr}$, is 0.28.

The semiconductor particles were dispersed in a solvent together with PMMA forming a matrix, and a quartz glass was spin-coated with the resultant dispersion so as to form a super-resolution film having a thickness of 100 nm. The absorption spectrum of the super-resolution film thus formed was measured, finding that the wavelength at absorption peak of exciton was 418 nm. For measuring the transmittance of the super-resolution film, used was SHG (wavelength of 418 nm) of a CW Ti:sapphire laser in conformity with the wavelength at absorption peak of exciton. The absorption saturation characteristics were evaluated based on transmittance measurements.

Figure 13:
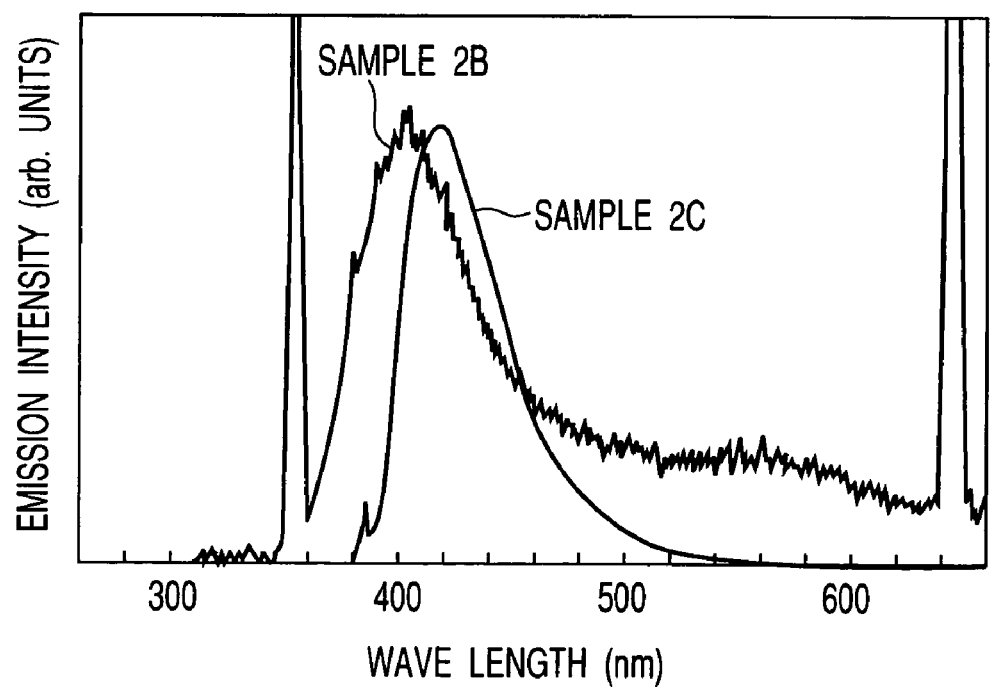
FIG. 13 shows emission spectra of the super-resolution films for Samples 2B and 2C.

The emission spectrum was measured by using a spectrofluorometer in respect of the semiconductor particles for each of Samples 2B and 2C. FIG. 13 shows the results. In Sample 2B (modal diameter of 1.0 nm), emission from impurity levels or interfacial levels was observed in the wavelength region of about 500 nm to 600 nm. It is considered reasonable to understand that, since there is a large leakage of the wave function of exciton in Sample 2B, the energy of exciton is transferred to the impurity levels outside the nanocrystallites. On the other hand, emission from impurity levels or interfacial levels was not observed in Sample 2C (modal diameter of 1.3 nm). These results show that it is desirable for the ratio of the modal diameter to the Bohr radius, i.e., $D_{mod}/D_{Bohr}$, to be at least 0.25.

Sample 2D:

CdSe nanocrystallites were prepared by a method similar to that described in C. B. Murray, J. Chem. Soc., 115, 8706 (1993). The CdSe nanocrystallites were extracted and particle diameters were examined so as to obtain particle size distribution. As a result, the modal diameter ($D_{mod}$) was found to be 6.5 nm. In this case, the ratio of the modal diameter to the Bohr radius, i.e., $D_{mod}/D_{Bohr}$, was 1.32.

The CdSe nanocrystallites were dispersed in an ethyl acetate solvent together with PMMA forming a matrix, and a quartz glass was coated with the resultant dispersion so as to form a super-resolution film having a thickness of about 100 nm. Then, the absorption spectrum of the super-resolution film was measured, finding that the wavelength at exciton absorption peak was 640 nm. For measuring the transmittance of the super-resolution film, used was a dye laser beam (wavelength of 640 nm) excited by SHG of a YAG laser in conformity with the wavelength at absorption peak of exciton. The absorption saturation characteristics were evaluated based on transmittance measurements.

Sample 2E:

A composition containing semiconductor particles was obtained substantially as in Sample 1A, except that bis(trimethylsilyl) selenide was used as a raw material in place of bis(trimethylsilyl) sulfide, methanol was used as a solvent in place of 2-butoxy ethanol, and that the solvent temperature was controlled at about 5° C. in mixing the bis(trimethylsilyl) selenide with the solvent containing the reactants. The temperature control was performed for obtaining fine semiconductor particles, compared with Sample 2A.

In the composition, semiconductor particles of CdSe nanocrystallites having AMEO residual moiety covalently bonded at an amino-terminated end to the surface thereof were dispersed in the matrix of AMEO polymer.

The particle diameters of the semiconductor particles were examined so as to obtain the particle size distribution. The semiconductor particles were found to have the modal diameter ($D_{mod}$) of 1.0 nm. In this case, the ratio of the modal diameter to the Bohr radius, i.e., $D_{mod}/D_{Bohr}$, was 0.20.

A super-resolution film having a thickness of about 100 nm was formed by coating a quartz glass with the resultant composition. The absorption spectrum of the super-resolution film was measured, finding that the wavelength at absorption peak of exciton was about 400 nm. Also, the presence or absence of the absorption saturation phenomenon was examined by measuring the transmittance of the super-resolution film. For measuring the transmittance, used was SHG (wavelength of 400 nm) of a CW Ti:sapphire laser in conformity with the wavelength at absorption peak of exciton. The absorption saturation characteristics were evaluated based on transmittance measurements.

Sample 2F:

A film having a thickness of about 300 nm was formed on a quartz glass by co-sputtering using a $CdS_{0.6}Se_{0.4}$ target and a $SiO_2$ target. The sputtering powers were 200 W for $CdS_{0.6}Se_{0.4}$ and 500 W for $SiO_2$. The deposition rates under these conditions were 4.5 nm/min for $CdS_{0.6}Se_{0.4}$ and 3.8 nm/min for $SiO_2$.

In the film, semiconductor particles of $CdS_{0.6}Se_{0.4}$ nanocrystallites were dispersed in the matrix made of $SiO_2$. The film was observed with TEM for examining particle diameters of the semiconductor particles so as to obtain particle size distribution. The modal diameter ($D_{mod}$) of the semiconductor particles was found to be 0.85 nm. Also, the $CdS_{0.6}Se_{0.4}$ exciton Bohr radius, calculated from the crystal mixing ratio, was 3.6 nm. It follows that the ratio of the modal diameter to the Bohr radius, i.e., $D_{mod}/D_{Bohr}$, was 0.24. Analysis by XPS revealed that CdS crystallites were covalently bonded with $SiO_2$. The ratio of covalently bonded atoms to the total atoms on the surface of the CdS crystallite was about 20 mol % or more.

The absorption spectrum of the super-resolution film was measured, finding that the wavelength at absorption peak of exciton was about 405 nm. For measuring the transmittance, used was SHG (wavelength of 405 nm) of a CW Ti:sapphire laser in conformity with the wavelength at absorption peak of exciton. The absorption saturation characteristics were evaluated based on transmittance measurements. In this case, a change in the transmittance accompanying the change in the laser beam intensity was not recognized. Also, no emission was observed, which indicated emission life of 50 psec or less. Further, four-wave mixing light was not observed. Therefore, it was found that phase relaxation time was 0.5 fsec or less.

TABLE 2

| | Super-resolution film | | | | | | Absorption saturation characteristics | |
|---|---|---|---|---|---|---|---|---|
| | Semiconductor particles | | | | | | T | |
| Sample | S | R | $D_{mod}$ | $D_{mod}/D_{Bohr}$ | M | $A_{max}$ | λ | 100 kW/cm² | 1 MW/cm² |
| 2A | CdSe | AMEO | 1.6 nm | 0.3 | AMEO polymer | 405 nm | 405 nm | 10% | 16% |
| 2B | $CdS_{0.1}Se_{0.9}$ | — | 1.0 nm | 0.21 | PMMA | 400 nm | 400 nm | 10% | 13% |
| 2C | $CdS_{0.1}Se_{0.9}$ | — | 1.3 nm | 0.28 | PMMA | 418 nm | 418 nm | 10% | 16% |
| 2D | CdSe | — | 6.5 nm | 1.32 | PMMA | 640 nm | 640 nm | 10% | 13% |
| 2E | CdSe | AMEO | 1.0 nm | 0.20 | PMMA | 400 nm | 400 nm | 10% | 14% |
| 2F | $CdS_{0.6}Se_{0.4}$ | — | 0.85 nm | 0.24 | $SiO_2$ | 405 nm | 405 nm | no change | |

$D_{mod}/D_{Bohr}$ represents a ratio of modal diameter $D_{mod}$ of semiconductor particles to Bore radius $D_{Bohr}$ of the semiconductor.

Table 2 supports that a super-resolution film, in which the particle diameter of the semiconductor particles absorbing light having a wavelength used is not smaller than ¼ and not larger than one times as large as the exciton Bohr radius, exhibits excellent absorption saturation characteristics and, thus, excellent super-resolution characteristics.

Example 1 and Comparative Example 1

An optical disk having a structure as shown in FIG. 2 was fabricated by using the super-resolution film prepared in Sample 2A. The optical disk (Example 1) was fabricated such that the super-resolution film and a reflection film having a thickness of about 80 nm and made of aluminum were formed on a transparent polycarbonate substrate on which recording pits were formed at a track pitch of about 0.4 μm. The track pitch was shorter than the mark pitch.

The optical disk was rotated at a linear velocity of 10 m/s, and was irradiated through a lens of NA 0.6 with a laser beam coming from the side of the substrate and having a wavelength of 405 nm and a power of 3 mw so as to read out the reflected light to reproduce the data recorded on the optical disk.

Under the conditions described above, the spot size of the laser beam on the substrate was about 0.7 μm. It follows that, in the optical disk that does not comprise the super-resolution film, crosstalk is caused because the laser beam spot is larger than the track pitch. In the optical disk of Example 1 comprising the super-resolution film of Sample 2A, however, it was possible to reproduce the recorded data accurately.

For comparison, an optical disk (Comparative Example 1) was similarly prepared by using the film prepared in Sample 2F, and the reproduction of the recorded data was attempted under the same conditions as above. However, crosstalk occurred even in the optical disk of Comparative Example 1, resulting in failure to read out accurately the recorded data.

The results of Samples 3A to 3C given below are shown in Table 3.

Sample 3A:

$CsS_{0.6}Se_{0.4}$ nanocrystallites were formed by a method similar to that described in F. Gindele et al., Appl. Phys. Lett. 71, 2181 (1997).

Cadmium acetate dihydrate was subjected to reflux so as to prepare cadmium ethoxy acetate, followed by drying to obtain powder. The powder thus prepared was dissolved in an ethanol solvent. Then, bis (trimethylsilyl) sulfide and bis (trimethylsilyl) selenide were added to the resultant solution at a molar ratio of 6:4 and the mixture was heated. Further, solvent exchange from ethanol to ethyl acetate was performed, thus a solution containing $CdS_{0.6}Se_{0.4}$ nanocrystallites as the semiconductor particles was provided. Ethyl groups were covalently bonded to the surface of the semiconductor particles.

The semiconductor particles were observed with TEM so as to examine particle diameters to obtain particle size distribution. The modal diameter ($D_{mod}$) of the semiconductor particles was found to be 0.85 nm. Also, since the $CdS_{0.6}Se_{0.4}$ exciton Bohr radius calculated from the crystal mixing ratio was 3.6 nm, the ratio of the modal diameter to the Bohr radius, i.e., $D_{mod}/D_{Bohr}$, was 0.24.

Then, PMMA having a molecular weight of 75,000 was dissolved in the solution, and a quartz glass was spin-coated with the resultant solution so as to form a super-resolution film having a thickness of about 100 nm. In the super-resolution film thus obtained, $CsS_{0.6}Se_{0.4}$ nanocrystallites having ethyl groups covalently bonded to the surface thereof were dispersed in the PMMA matrix.

The absorption spectrum of the super-resolution film was measured, finding that the wavelength at absorption peak of exciton was about 405 nm. The presence or absence of the absorption saturation phenomenon was examined by measuring the transmittance of the super-resolution film. For measuring the transmittance, used was SHG (wavelength of 405 nm) of CW Ti:sapphire laser in conformity with the wavelength at absorption peak of exciton. The transmittance values were found to be about 8% under a power density of 100 kW/cm² and about 30% under a power density of 1 MW/cm², supporting excellent absorption saturation characteristics.

For examining the super-resolution effect of the super-resolution film, measured was a ratio of an aperture size formed in the super-resolution film to a spot size of the laser beam under a power density of 1 MW/cm². It was confirmed that the aperture size was narrowed by about 25%.

Then, the $CsS_{0.6}Se_{0.4}$ nanocrystallites were separated from PMMA. The $CsS_{0.6}Se_{0.4}$ nanocrystallites were placed in AMEO/ethanol so as to substitute the ethyl group with AMEO, thus the $CsS_{0.6}Se_{0.4}$ nanocrystallites bonded with AMEO polymer were prepared. As a result, the absorption saturation characteristics were lowered by about ½. This indicated that the covalent bonds between the polymer matrix and the semiconductor nanocrystallites forming quantum well exhibited adverse effect to the absorption saturation characteristics.

Sample 3B:

Prepared was a composition, in which CdS nanocrystallites having a dendrimer of fourth-generation starburst polyaminoamine (PAMAM) (available from Aldrich), shown in the chemical formula below, covalently bonded to the surface thereof were dispersed in a matrix of the same dendrimer, by using a methanol solvent and under a pH of 11.8 by a method similar to that described in K. Sooklal et al., Adv. Mater., 10, 1083 (1998).

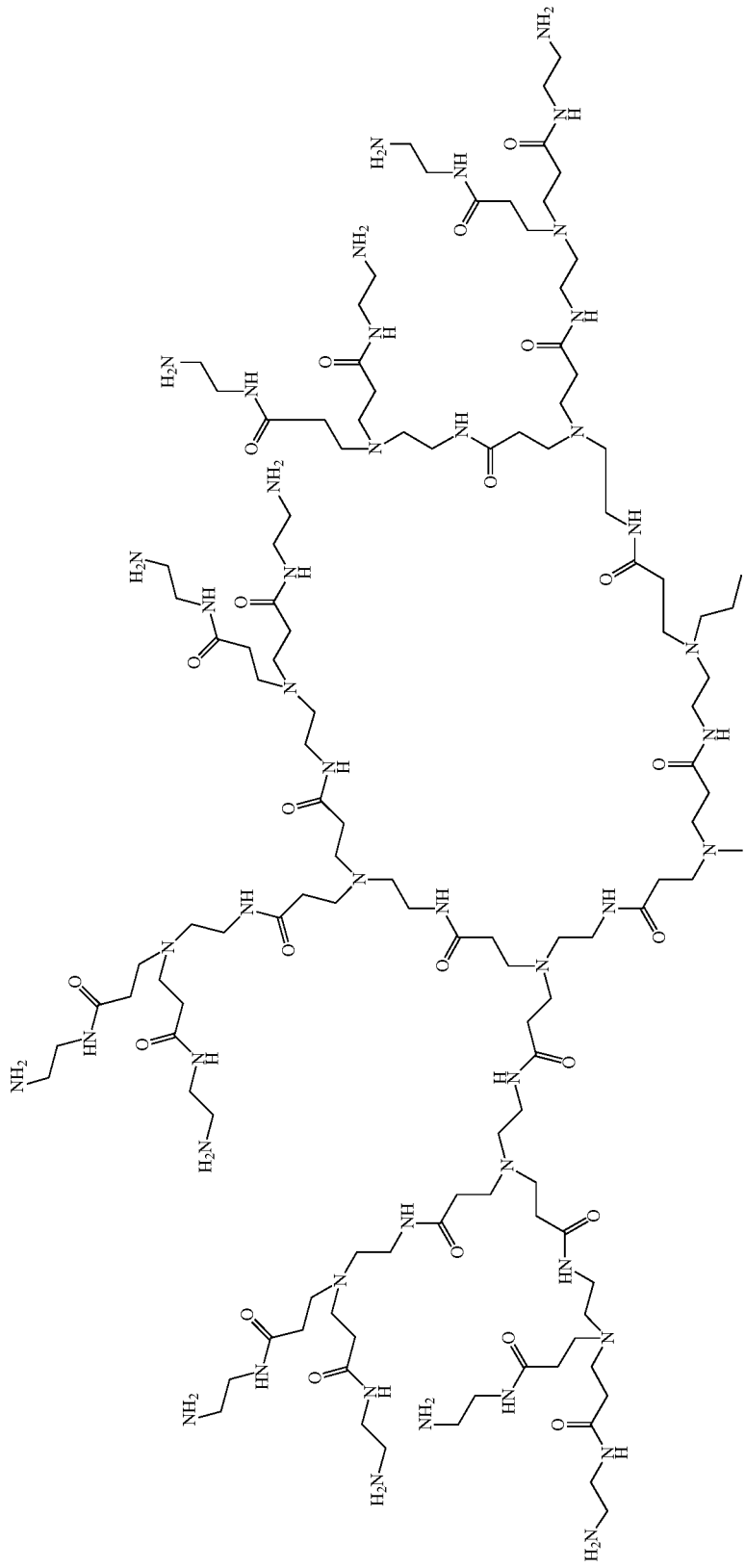

-continued
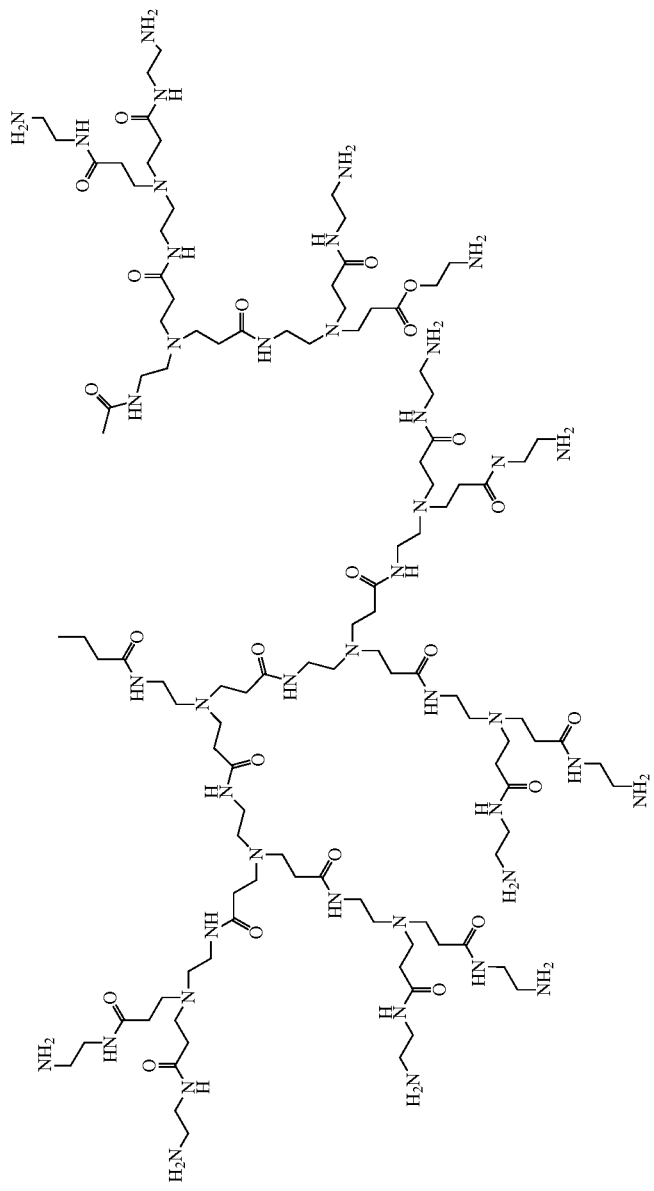

The particle diameters of the semiconductor particles, excluding the dendrimer, were examined so as to obtain the particle size distribution, finding that the modal diameter ($D_{mod}$) was about 3.4 nm.

A super-resolution film having a thickness of about 100 nm was formed by coating a quartz glass with the resultant composition. The absorption spectrum of the super-resolution film was measured, finding that the wavelength at absorption peak of exciton was about 360 nm. The presence or absence of the absorption saturation phenomenon was examined by transmittance measurements of the super-resolution film. For measuring the transmittance, used was SHG (wavelength of 360 nm) of a CW Ti:sapphire laser in conformity with the wavelength at absorption peak of exciton. As a result, the absorption saturation characteristics were observed. It follows that the super-resolution film containing semiconductor particles having dendrimer covalently bonded to the surface thereof also exhibits satisfactory absorption saturation characteristics.

Sample 3C:

It is known that CuCl forms nanocrystallites in NaCl. Semiconductor particles of CuCl nanocrystallites having a modal diameter of 6 nm were prepared in NaCl.

The absorption spectrum of the semiconductor particles was measured, finding that the wavelength at absorption peak of exciton was 385 nm. Emission of the semiconductor particles was measured under the temperature of 77K by using a spectrofluorometer so as to recognize the exciton emission. Also, the energy relaxation time of the semiconductor particles was measured by using a streak camera, finding that the energy relaxation time was about 200 psec.

A super-resolution film was prepared by the crystal growth of NaCl doped with CuCl on a quartz glass substrate, followed by applying heat treatment to the grown film. The presence or absence of the absorption saturation phenomenon was examined by transmittance measurements of the super-resolution film. For measuring the transmittance, used was SHG (wavelength of 385 nm) of a CW Ti:sapphire laser in conformity with the wavelength at absorption peak of exciton. The transmittance was measured under the temperature of 77K. The transmittance values were found to be about 10% under a power density of 0.6 W/cm$^2$ and about 16% under a power density of 500 kW/cm$^2$. It follows that a super-resolution film containing semiconductor particles having at least 50 psec of an energy relaxation time until occurrence of exciton emission exhibits satisfactory absorption saturation characteristics.

were formed on a transparent polycarbonate substrate on which recording pits were formed at a track pitch of about 0.35 μm. The track pitch was shorter than the mark pitch.

The optical disk was rotated at a linear velocity of about 10 m/s, and was irradiated through a lens of NA 0.6 with a laser beam coming from the side of the substrate and having a wavelength of 405 nm and a power of about 3 mW so as to read out the reflected light to reproduce the data recorded on the optical disk.

Under the conditions described above, the spot size of the laser beam on the substrate was about 0.7 μm. It follows that, in the optical disk that does not comprise the super-resolution film, crosstalk is caused because the laser beam spot is larger than the track pitch. In the optical disk of Example 2 comprising the super-resolution film of Sample 3A, however, it was possible to reproduce the recorded data accurately.

Sample 4A

CdTe nanocrystallites were prepared by a method similar to that described in T. Rajh, O. I. Micic and A. J. Nozik, J. Phys. Chem., 97, 11999(1993). The CdTe nanocrystallites had a residual moiety of 3-mercapto-1,2-propanediol covalently bonded at an thiol-terminated end to the surface thereof. The modal diameter ($D_{mod}$) of the CdTe nanocrystallites was found to be about 2 nm. Based on the known CdTe exciton Bohr radius ($D_{Bohr}$) of 7.3 nm, the ratio of the modal diameter to the Bohr radius, i.e., $D_{mod}/D_{Bohr}$, was 0.25 or more and 1 or less.

The CdTe nanocrystallites were dispersed in a solvent together with polyvinyl alcohol, and a quartz glass was spin-coated with the resultant dispersion so as to form a super-resolution film having a thickness of about 200 nm. The absorption spectrum of the super-resolution film thus formed was measured, finding that the wavelength at absorption peak of exciton was about 420 nm. The super-resolution film exhibited absorbance of about 0.5 at low power regions. For measuring the transmittance of the super-resolution film, used was SHG (wavelength of 420 nm) of a Q-switching Ti:sapphire laser. The transmittance values were about 30% under the power density of 100 kw/cm$^2$ and about 50% under the power density of 1 MW/cm$^2$, indicating remarkable increase with increase in the incident light intensity. From observation with a microscopic beam profiler, it was found that the FWHM of the laser beam was decreased by about 7% after the laser beam was transmitted through the super-resolution film.

TABLE 3

| Sample | Semiconductor particles | | | | | | | T | |
| --- | --- | --- | --- | --- | --- | --- | --- | --- | --- |
| | S | R | $D_{mod}$ | $D_{mod}/D_{Bore}$ | M | $A_{max}$ | λ | 100 kW/cm$^2$ | 1 mW/cm$^2$ |
| 3A | CdS$_{0.6}$Se$_{0.4}$ | ethyl dendrimer | 0.85 nm | 0.24 | PMMA | 405 nm | 405 nm | 8% | 30% |
| 3B | CdS | dendrimer | 3.4 nm | — | dendrimer | 360 nm | 360 nm | 10% | 13% |
| 3C | CuCl | — | 6 nm | — | NaCl | 385 nm | 385 nm | 10% (0.6 kW/cm$^2$) | 16% (500 kW/cm$^2$) |

Example 2

An optical disk having a structure as shown in FIG. 2 was fabricated by using the super-resolution film prepared in Sample 3A. The optical disk (Example 2) was fabricated such that the super-resolution film and a reflection film having a thickness of about 80 nm and made of aluminum Example 3

CdS nanocrystallites including a dendrimer covalently bonded to the surface thereof were prepared by a method similar to that described in B. I. Lemon and R. M. Crooks, J. Am. Chem. Soc., 122, 12886(2000). Specifically, Cd(NO$_3$)$_2$ and Na$_2$S were added to a methanol solution of hydroxy-terminated polyaminoamine (PAMAM) dendrimer of eighth-generation so that CdS nanocrystallites are generated in the dendrimer. The concentrations of hydroxy-terminated dendrimer and $Cd^{2+}.S^{2-}$ were 0.012 mM and 3.1 mM, respectively.

The wavelength at exciton absorption peak of this solution was about 370 nm. A quartz glass was dipped in the solution so as to form a super-resolution film. The absorbance of the super-resolution film was about 0.3.

When SHG of Ti:sapphire, having a power of about 5 mW, was transmitted through a lens of NA 0.65, the beam waist could be converged to about 0.35 μm. Then, a glass substrate on which the above super-resolution film was formed was placed in the vicinity of the focal point of the laser beam so as to measure the beam waist, finding to be about 0.33 μm.

An optical disk shown in FIG. 2 was fabricated such that the super-resolution film and a reflection film were formed on a polycarbonate substrate on which recording pits were formed.

In this optical disk, CNR from recording pits having a size of 0.2 μm was improved to 23 dB from 20 dB.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical disk from which recorded data are read out by light irradiation, comprising:
   a substrate comprising recording pits as data on a surface thereof; and
   stacked films formed on the substrate, the films comprising a super-resolution film containing a polymer matrix and particles each consisting of a semiconductor particle and an organic group covalently bonded thereto, and a reflective film reflecting light, the super-resolution film and the reflective film being provided in this order from a light incident side, and a modal diameter in particle size distribution of the particles being not smaller than ¼ and not larger than one times as large as a Bohr radius of an exciton of the semiconductor,
   wherein the organic group covalently bonded to the semiconductor particle is directly in contact with the polymer matrix and wherein even in the case where a part of polymer molecules in the polymer matrix is covalently bonded to the semiconductor particle, a ratio of the polymer molecules bonded to the semiconductor particle is 1 mol % or less of the entire polymer molecules in the polymer matrix.

2. The optical disk according to claim 1, wherein the semiconductor particle comprises at least one semiconductor material selected from the group consisting of CdS, CdSe, $CdS_xSe_{1-x}$, ZnSe, ZnS, $ZnS_xSe_{1-x}$, $Cd_xZn_{1-x}$ S, $Cd_xZn_{1-x}$ Se, GaN, $Ga_xIn_{1-x}$ N, ZnO, CuCl, $HgI_2$ and $PbI_2$, where 0<x<1.

3. The optical disk according to claim 1, wherein a halogen content of the organic group is 1 mol % or less.

4. The optical disk according to claim 1, wherein the organic group is selected from the group consisting of an alkyl group, a residual moiety of a silane compound, a residual moiety of a thiol compound and a residual moiety of a dendrimer.

5. The optical disk according to claim 1, wherein the polymer matrix comprises at least one polymer selected from the group consisting of polymethyl methacrylate, polystyrene, polycarbonate, polyvinyl alcohol, polyacetal, polyacrylate and a dendrimer.

6. The optical disk according to claim 1, wherein the semiconductor particles provide particle size distribution that a full width at half maximum is not larger than a modal diameter.

7. The optical disk according to claim 1, wherein the semiconductor particles show exciton emission, and an energy relaxation time of the exciton is not less than 50 psec.

8. An optical disk to which data are recorded by light irradiation, comprising:
   a substrate; and
   stacked films formed on the substrate, the films comprising a super-resolution film containing a polymer matrix and particles each consisting of a semiconductor particle and an organic group covalently bonded thereto, an optical recording layer to which data are recorded, and a reflective film reflecting light, the super-resolution film, the optical recording layer and the reflective film being provided in this order from a light incident side, and a modal diameter in the particle size distribution of the semiconductor particles is not smaller than ¼ and not larger than one times as large as a Bohr radius of an exciton of the semiconductor,
   wherein the organic group covalently bonded to the semiconductor particle is directly in contact with the polymer matrix and wherein even in the case where a part of polymer molecules in the polymer matrix is covalently bonded to the semiconductor particle, a ratio of the polymer molecules bonded to the semiconductor particle is 1 mol % or less of the entire polymer molecules in the polymer matrix.

9. The optical disk according to claim 8, wherein the semiconductor particle comprises at least one semiconductor material selected from the group consisting of CdS, CdSe, $CdS_xSe_{1-x}$, ZnSe, ZnS, $ZnS_xSe_{1-x}$, $Cd_xZn_{1-x}$ S, $Cd_xZn_{1-x}$ Se, GaN, $Ga_xIn_{1-x}$ N, ZnO, CuCl, $HgI_2$ and $PbI_2$, where 0<x<1.

10. The optical disk according to claim 8, wherein a halogen content of the organic group is 1 mol % or less.

11. The optical disk according to claim 8, wherein the organic group is selected from the group consisting of an alkyl group, a residual moiety of a silane compound, a residual moiety of a thiol compound and a residual moiety of a dendrimer.

12. The optical disk according to claim 8, wherein the polymer matrix comprises at least one polymer selected from the group consisting of polymethyl methacrylate, polystyrene, polycarbonate, polyvinyl alcohol, polyacetal, polyacrylate and a dendrimer.

13. The optical disk according to claim 8, wherein the semiconductor particles provide particle size distribution that a full width at half maximum is not larger than a modal diameter.

14. The optical disk according to claim 8, wherein the semiconductor particles show exciton emission, and an energy relaxation time of the exciton is not less than 50 psec.

* * * * *